(12) United States Patent
Hunt, III

(10) Patent No.: US 8,662,522 B1
(45) Date of Patent: Mar. 4, 2014

(54) TOW BAR ASSEMBLY

(71) Applicant: Charles E. Hunt, III, South Haven, MN (US)

(72) Inventor: Charles E. Hunt, III, South Haven, MN (US)

(*) Notice: Subject to any disclaimer, the term of this patent is extended or adjusted under 35 U.S.C. 154(b) by 0 days.

(21) Appl. No.: 13/633,224

(22) Filed: Oct. 2, 2012

(51) Int. Cl.
*B60D 1/52* (2006.01)

(52) U.S. Cl.
USPC ..................................................... 280/491.5

(58) Field of Classification Search
USPC .................................. 280/491.5, 491.3, 484
See application file for complete search history.

(56) References Cited

U.S. PATENT DOCUMENTS

| | | | | |
|---|---|---|---|---|
| 6,068,281 A * | 5/2000 | Szczypski | ................... | 280/479.2 |
| 6,135,485 A * | 10/2000 | Filbrun | ......................... | 280/493 |
| 7,011,329 B2 * | 3/2006 | Yoder | ............................ | 280/493 |
| 7,909,350 B1 * | 3/2011 | Landry | ...................... | 280/479.2 |

* cited by examiner

*Primary Examiner* — Tony Winner
(74) *Attorney, Agent, or Firm* — Dave Alan Lingbeck

(57) ABSTRACT

A tow bar assembly for towing a vehicle which is immovable and stuck. The tow bar assembly includes an interconnector assembly including a first elongate member and an linkage assembly being hingedly attached to the first elongate member; a biased assembly for biasing the linkage assembly relative to the first elongate member; and a stop assembly being engagable to the linkage assembly upon the linkage assembly being in a biased position relative to the first elongate member.

8 Claims, 4 Drawing Sheets

TOW BAR ASSEMBLY

BACKGROUND OF THE INVENTION

1. Field of the Invention

The present invention relates to tow bars and more particularly pertains to a new tow bar assembly for towing a vehicle which is immovable and stuck.

2. Description of the Prior Art

The use of tow bars is known in the prior art. More specifically, tow bars heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a tow bar assembly for a vehicle, such as a motor vehicle. The tow bar assembly has a pivot joint and a spring on one side of the pivot joint. A first member of the pivot joint pivotally engages a second member of the pivot joint to allow the joint to pivot in a vertical direction. The spring is located between and attached to the first and second members. The spring is preferably adjustable in order to adjust the tension of the spring. Another prior art includes a tow bar comprising an arm which is articulated to the lower front zone of the vehicle structure. At its front free end it comprises a coupling ring and a pivot to an industrial traction vehicle. A torsion spring mounted on its tipping axle causes the tow bar to tip in the ascending direction of the tow bar to a stable position when it is fitted to the vehicle front. Further, another prior art describes a tow bar with a torsion spring disposed between the tow bar and a steering arm to urge the tow bar towards an operating position, the torsion spring minimizing the force required by an operator to lift the tow bar. While these devices fulfill their respective, particular objectives and requirements, the aforementioned patents do not disclose a new tow bar assembly.

SUMMARY OF THE INVENTION

The general purpose of the present invention, which will be described subsequently in greater detail, is to provide a new tow bar assembly which has many of the advantages of the tow bars mentioned heretofore and many novel features that result in a new tow bar assembly which is not anticipated, rendered obvious, suggested, or even implied by any of the prior art tow bars, either alone or in any combination thereof. The present invention includes an interconnector assembly including a first elongate member and an linkage assembly being hingedly attached to the first elongate member; a biased assembly for biasing the linkage assembly relative to the first elongate member; and a stop assembly being engagable to the linkage assembly upon the linkage assembly being in a biased position relative to the first elongate member. None of the prior art includes the combination of the elements of the present invention.

There has thus been outlined, rather broadly, the more important features of the tow bar assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tow bar assembly which has many of the advantages of the tow bars mentioned heretofore and many novel features that result in a new tow bar assembly which is not anticipated, rendered obvious, suggested, or even implied by any of the prior art tow bars, either alone or in any combination thereof.

Still another object of the present invention is to provide a new tow bar assembly for towing a vehicle that is immovable and stuck.

Still yet another object of the present invention is to provide a new tow bar assembly that makes it easy for the user to connect to a vehicle which is mired deep in muck since an elongate member of the tow bar assembly is biased in an upright position.

Even still another object of the present invention is to provide a new tow bar assembly that applies upward force to the vehicle being towed and that allows a user to connect to a vehicle without the tow bar also being sunk down in the muck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
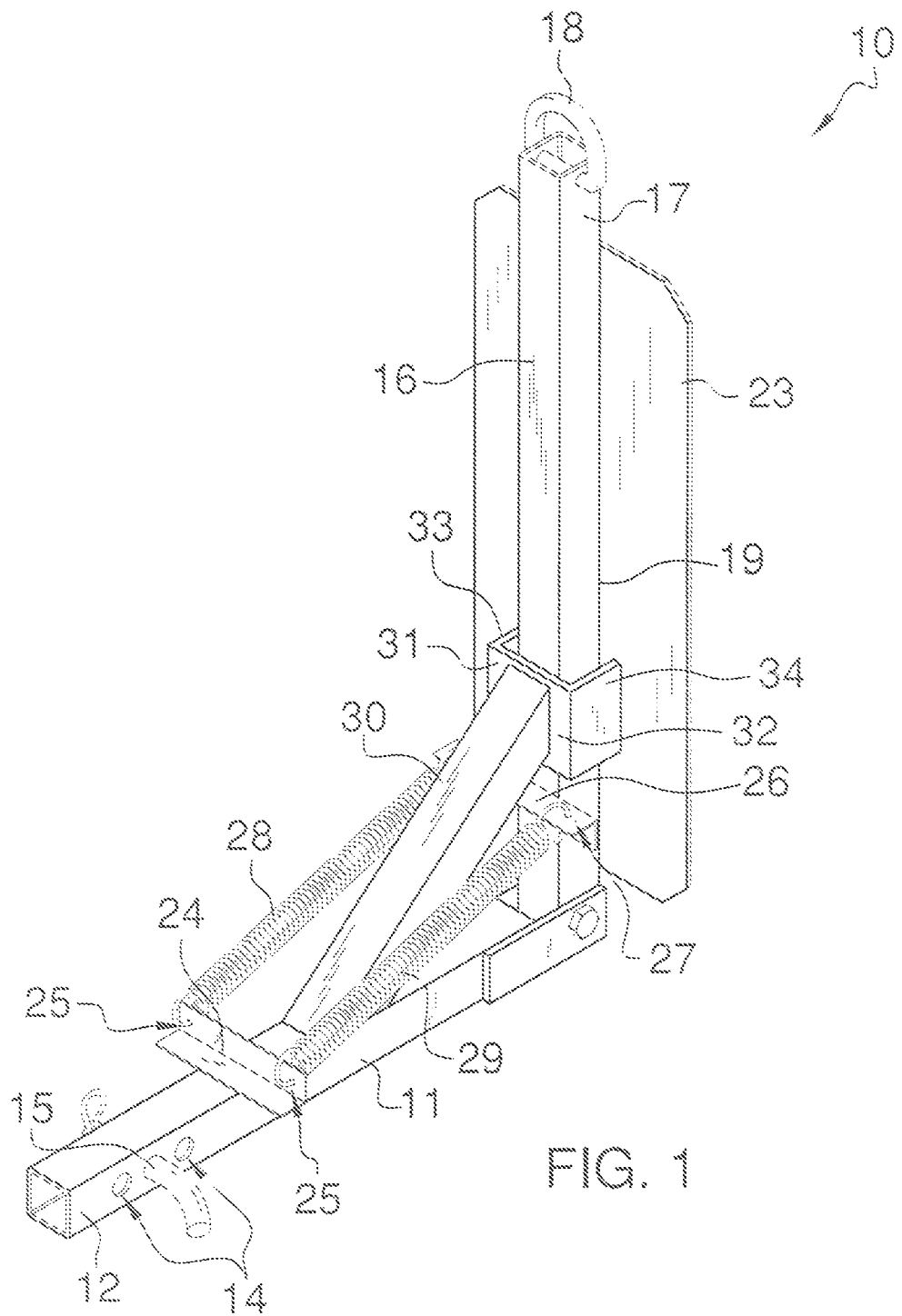
FIG. 1 is a perspective view of a new tow bar assembly according to the present invention.

With reference now to the drawings, and in particular to FIGS. 1 through 4 thereof, a new tow bar assembly embodying the principles and concepts of the present invention and generally designated by the reference numeral 10 will be described.

As best illustrated in FIGS. 1 through 4, the tow bar assembly 10 generally comprises an interconnector assembly including a first elongate member 11 and an linkage assembly being hingedly attached to the first elongate member 11, and also comprises a biased assembly for biasing the linkage assembly relative to the first elongate member 11, and further comprises a stop assembly being engagable to the linkage assembly upon the linkage assembly being in a biased position relative to the first elongate member 11.

The first elongate member has a front end 12 being conventionally connectable to a hitch and having holes 14 being transversely disposed therethrough for receiving a fastener 15 to connect the first elongate member 11 to the hitch. The linkage assembly includes a second elongate member 16 having a first end being hingedly connected to a back end 13 of the first elongate member 11. The second elongate member 16 is an elongate tubular member having a back side 19 and a front side. The linkage assembly also includes a rigid planar member 23 being conventionally attached and welded to the elongate tubular member and extending along a selected length thereof. The rigid planar member 23 has a width greater than that of the elongate tubular member to provide a much greater surface area so that the linkage assembly can rest upon a mucky surface and won't easily sink into the muck. The interconnector assembly further includes a tow ring 18 being conventionally attached to a second end 17 of the second elongate member 16 for connecting to and facilitating the towing of a vehicle.

Figure 2:
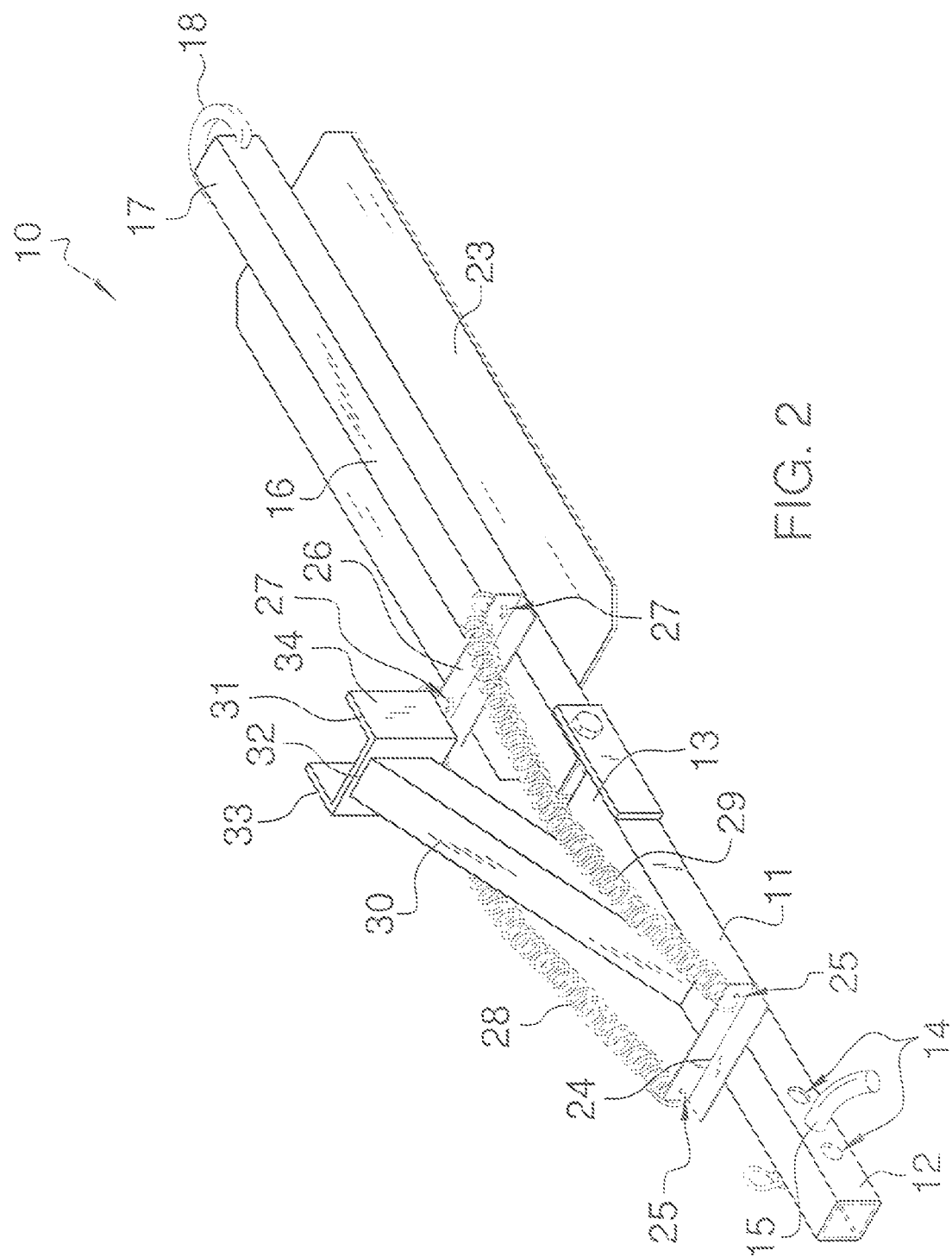
FIG. 2 is another perspective view of the present invention being in an extended position.
Figure 3:
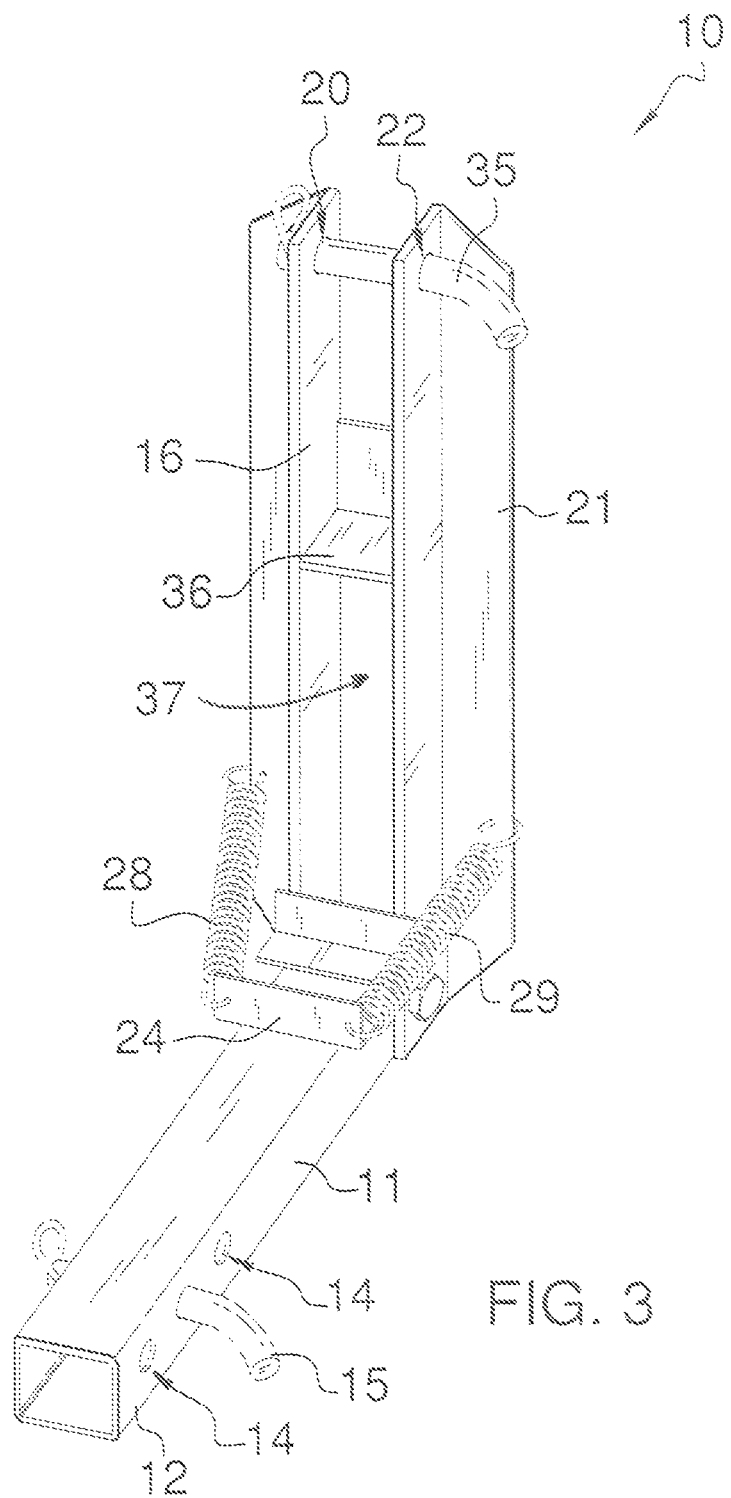
FIG. 3 is a perspective view of a second embodiment of the present invention being in a biased position.
Figure 4:
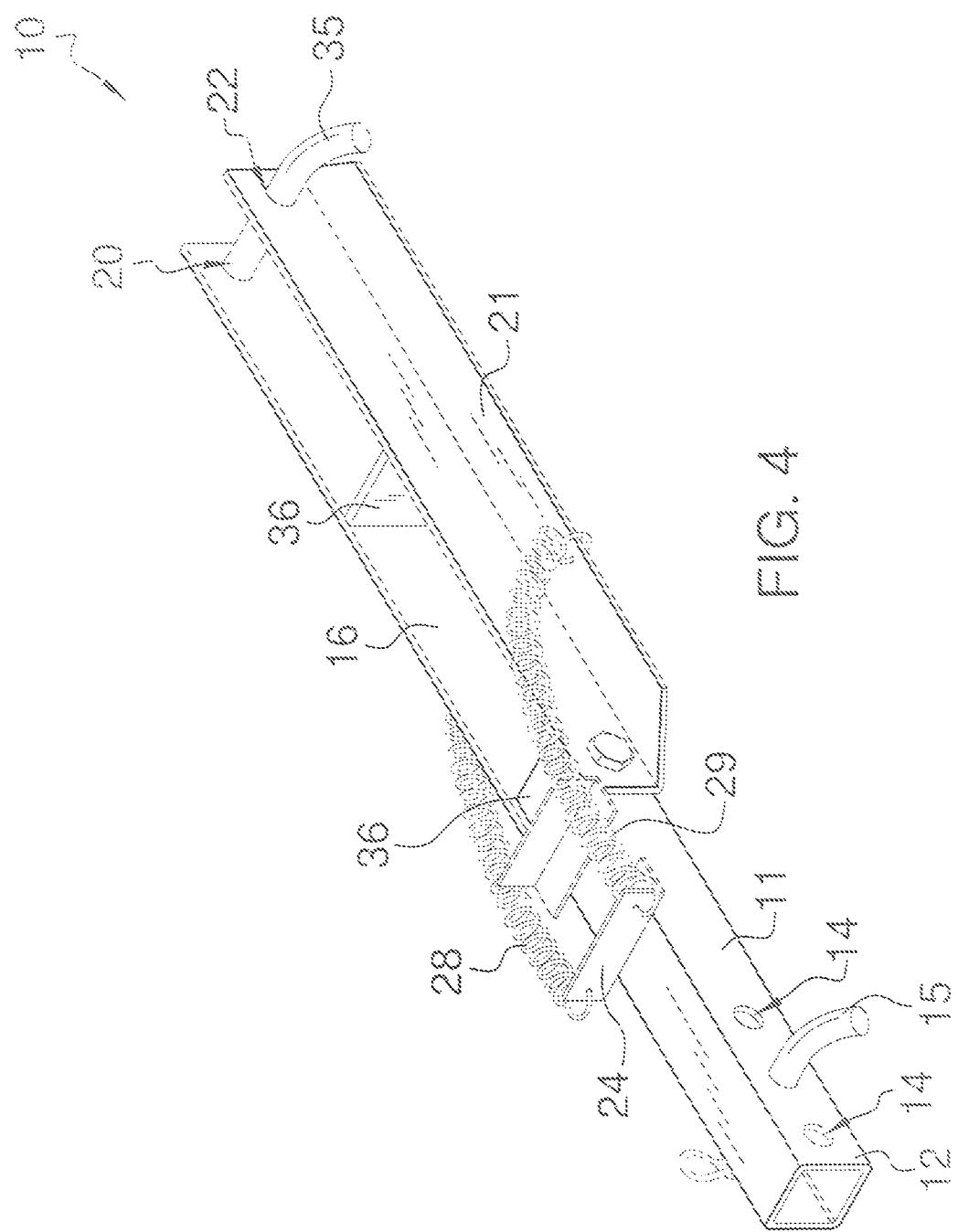
FIG. 4 is another perspective view the second embodiment of the present invention being in an extended position.

As a second embodiment as shown in FIGS. 2 & 3, the linkage assembly includes second and third elongate members 16,21 being spaced apart and disposed parallel to one another and forming an opening 37 therebetween for receiving a winch cable to further assist in the removal of a vehicle stuck in the mucky surface, and also includes cross members 36 being spaced apart and conventionally attached and welded to and interconnecting the second and third elongate members 16,21. Each of the second and third elongate members 16,21 has an angled lateral cross section to provide strength and long lasting durability, and also has a hole 20,22 being disposed therethrough near a second end 17 thereof for receiving a fastening member 35 for connecting to the vehicle to be towed.

The biased assembly includes brackets 24,26 being conventionally attached to the first elongate member 11 and to the linkage assembly and having holes 25,27 being disposed therethrough. The biased assembly further includes two biased elements 28,29 being in communication with the first elongate member 11 and to the linkage assembly and having hooked ends which are inserted in the holes 25,27 in the brackets 24,26 for biasing the linkage assembly perpendicularly relative to the first elongate member 11. The stop assembly includes an elongate support member 30 being conventionally attached to the first elongate member 11 and also includes a stopper member 31 being conventionally attached at a distal end of the elongate support member 30 and being engagable to a biased linkage assembly. The elongate support member 30 extends rearwardly toward the back end 13 and at an acute angle relative to the first elongate member 11. The stopper member 31 is engagable to the second elongate member 16 and has a main wall 32 being conventionally attached to the elongate support member 30, and also has side walls 33,34 being conventionally attached to the main wall 32 and being spaced apart to receive a biased second elongate member 16 therebetween.

In use, the user connects the first elongate member 11 to the hitch receiver of the prime mover by sliding the front end 12 of the first elongate member 11 into the hitch receiver and aligning the selected holes 14 in the first elongate member 11 with the holes in the hitch receiver and inserting the fastener 15 into the holes. The user then maneuvers the prime mover relative to the vehicle to be towed so that the tow bar assembly is adjacent to the vehicle. The user pulls down on the biased linkage assembly and connects either the second end 17 of the linkage assembly or the tow ring 18 using the fastening member 35 to the vehicle and then pulls the vehicle behind the prime mover. Once finished the user disconnects the tow bar assembly from the vehicle and from the prime mover.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the tow bar assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tow bar assembly comprising:
   an interconnector assembly including a first elongate member and a linkage assembly hingedly attached to said first elongate member, wherein said first elongate member has a front end for connecting to a hitch and having holes transversely disposed therethrough for receiving a fastener to connect said first elongate member to the hitch, wherein said linkage assembly includes a second elongate member having a first end hingedly connected to a back end of said first elongate member, wherein said second elongate member is an elongate tubular member having a back side, said linkage assembly also including a rigid planar member attached to said elongate tubular member and extending along a selected length thereof;
   a biased assembly for biasing said linkage assembly relative to said first elongate member; and
   a stop assembly being engagable to said linkage assembly upon said linkage assembly being in a biased position relative to said first elongate member.

2. The tow bar assembly as described in claim 1, wherein said rigid planar member has a width greater than that of said elongate tubular member to facilitate support of said linkage assembly upon a mucky surface.

3. A tow bar assembly comprising:
   an interconnector assembly including a first elongate member and a linkage assembly being hingedly attached to said first elongate member, wherein said first elongate member has a front end for connecting to a hitch and having holes being transversely disposed therethrough for receiving a fastener to connect said first elongate member to the hitch, wherein said linkage assembly includes a second elongate member having a first end being hingedly connected to a back end of said first elongate member;
   a biased assembly for biasing said linkage assembly relative to said first elongate member, wherein said biased assembly further includes at least one biased element being in communication with said linkage assembly and said first elongate member for biasing said linkage assembly perpendicularly relative to said first elongate member; and
   a stop assembly being engagable to said linkage assembly upon said linkage assembly being in a biased position relative to said first elongate member.

4. The tow bar assembly as described in claim 3, wherein said biased assembly includes brackets being attached to said first elongate member and to said linkage assembly and having holes being disposed therethrough with said at least one biased element being connected to said brackets.

5. The tow bar assembly as described in claim 3, wherein said stop assembly includes an elongate support member being attached to said first elongate member.

6. The tow bar assembly as described in claim 5, wherein said elongate support member extends rearwardly toward said back end and at an acute angle relative to said first elongate member.

7. The tow bar assembly as described in claim 5, wherein said stop assembly also includes a stopper member being disposed at a distal end of said elongate support member and being engagable to a biased said linkage assembly.

8. The tow bar assembly as described in claim 7, wherein said stopper member is engagable to said second elongate member and has a main wall being attached to said elongate support member, and also has side walls being spaced apart to receive a biased said second elongate member therebetween.

\* \* \* \* \*